O. B. WOODFIELD, O. M. MORRIS & J. W. GOSLING.
AUTOMATIC SWIVEL SEARCH LIGHT BRACKET.
APPLICATION FILED FEB. 5, 1910. RENEWED NOV. 23, 1910.
997,352.
Patented July 11, 1911.
2 SHEETS—SHEET 1.
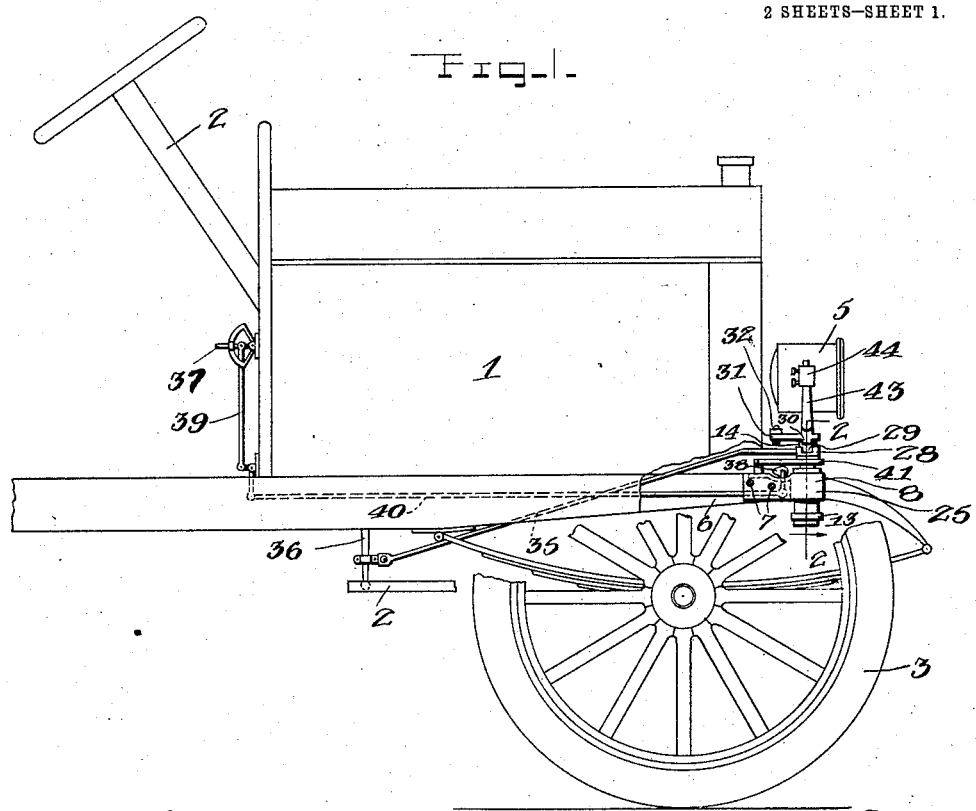

O. B. WOODFIELD, O. M. MORRIS & J. W. GOSLING.
AUTOMATIC SWIVEL SEARCH LIGHT BRACKET.
APPLICATION FILED FEB. 5, 1910. RENEWED NOV. 23, 1910.
997,352.
Patented July 11, 1911.
2 SHEETS—SHEET 2.
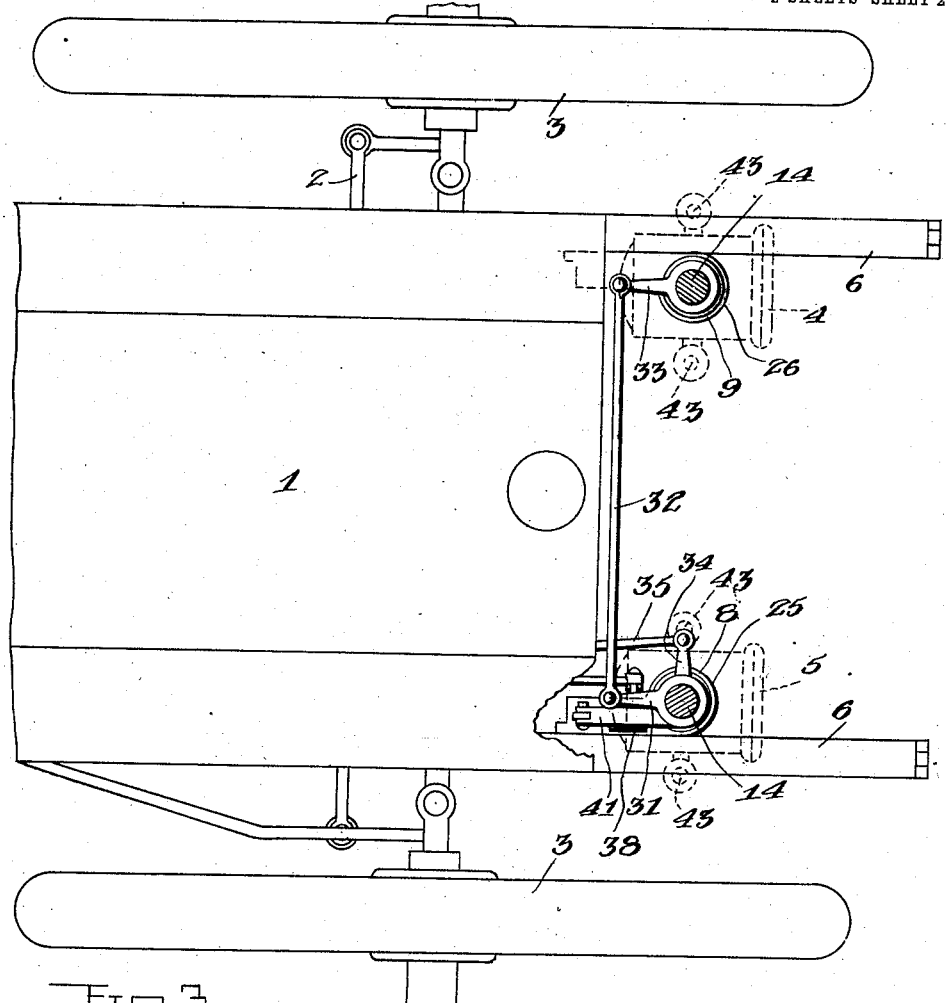
Fig. 3.
Fig. 4.
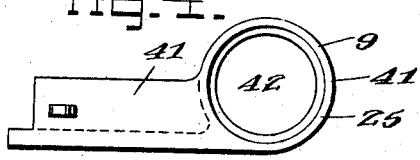
WITNESSES
INVENTORS:
O. B. Woodfield
O. M. Morris
J. W. Gosling
by their Attorney

UNITED STATES PATENT OFFICE.

OTIS B. WOODFIELD, OTTO M. MORRIS, AND JOHN W. GOSLING, OF SPRING LAKE BEACH, NEW JERSEY.

AUTOMATIC SWIVEL SEARCH-LIGHT BRACKET.

997,352.      Specification of Letters Patent.      Patented July 11, 1911.

Application filed February 5, 1910, Serial No. 542,220. Renewed November 23, 1910. Serial No. 593,958.

*To all whom it may concern:*

Be it known that we, OTIS B. WOODFIELD, OTTO M. MORRIS, and JOHN W. GOSLING, citizens of the United States, residing at Spring Lake Beach, in the county of Monmouth and State of New Jersey, have invented certain new and useful Improvements in Automatic Swivel Search-Light Brackets, of which the following is a specification.

Our invention relates to automobile search lights and especially to automobile swivel search light brackets and the main object of the invention is to produce a light that may be automatically turned in the direction of the front wheels of the vehicle when desired.

A further object of the invention is to provide means for locking and unlocking the search light so that it will either turn in the direction of the front wheels of the vehicle or not in accordance with the will of the operator.

In case the search light is turned in the direction of the front wheels the light from said search light will therefore, be directed in the direction of travel of the vehicle, and will thus prevent many accidents and avert many collisions, which will insure public safety to a large extent.

A further object of the invention is to produce a bracket of the kind indicated that will be simple in construction, efficient in operation, durable and inexpensive as to cost.

With the above and other objects in view our invention consists of the novel construction and arrangement of parts as are described in this specification, illustrated in the accompanying drawings forming a part thereof and particularly pointed out in the appended claims.

Reference being had to the drawings Figure 1 is a partial side elevation of an automobile to which our invention is applied, partly broken away. Fig. 2 is a vertical, transverse sectional view of the bracket, taken on the line 2—2 of Fig. 1. Fig. 3 is a diagrammatical top plan view of the front portion of an automobile to which our device is applied, partly broken away. Fig. 4 is a detail.

Referring more particularly to the drawing the invention is described as follows: The automobile 1 is supplied with the usual steering apparatus 2 which operates the front wheels 3 of the vehicle in the usual manner. Two search lights, 4 and 5, are each secured to the frame 6 of the machine by nut and bolt connections 7 or any other means adapted for the purpose, by the medium of the brackets 8 and 9, respectively.

As each bracket is constructed similarly we will endeavor to describe one of these only, reference being made especially to Fig. 2 of the drawings. The bracket 8 is provided with a socket or housing 10, the lower portion of which is furnished with external screw threads 11 which receive the internal threads 12 of the bracket cup 13. Received by said bracket or socket 8 is a screw threaded spindle 14 which is rotatably mounted therein by means of roller bearings 15 and 15' which bearings are interposed between the rings 16 and 17 which are held to said spindle 14 and rings 18 and 19 held to the inner periphery of said bracket or socket 8. Said roller bearings, 15 which are of any number desired for the purpose, are mounted in bearings in the washers 20 and 21, which washers encircle said rings 16. Locking nuts 22 are held by means of threads upon the spindle 14 and are for the purpose of holding the roller bearings 15 and 15' in place and also to prevent downward motion of said rings 16 and 17. The roller bearings 15' are held in a like manner between their respective rings by means of bearings in the washers 23 and 24, respectively. Thus the lights will turn freely with the motion of the front wheels of the vehicle as each bearing is of the type just described and offers very little friction to the rotation of the spindles received thereby. Encircling each of the sockets 8 and 9 are the sleeves 25 and 26, which sleeves are secured to said frame 6 by said nut and bolt connections 7. The socket or bracket of each lamp is received by its respective sleeve and is held temporarily against movement therein by means of a set screw 27. When it is desired to raise or lower either of said sockets within its respective sleeve the set screw 27 thereof is loosened when the position of the socket may be altered. Loosely encircling said spindle 14 is a ring 28 provided with notches 29, which notches are adapted to engage lugs 30, formed integral with the arm 31 which projects rearwardly and to whose rear end is pivoted a link 32 which is in turn pivoted to the similar arm 33 of the opposite lamp 4. Formed integral with the ring 28 and projecting inwardly is a third arm 34, which arm is pivotally connected to a connecting rod 35 which is securely held to the vertical operating arm 36 of said steering apparatus 2. Thus it will be seen that the lamp bracket 8 will turn simultaneously with the front wheels of the vehicle as the connecting rod 35 is secured directly to the steering apparatus 2. Both lamps will, of course, operate simultaneously as the motion of said search light 5 is transmitted to the search light 4 by means of said connecting rod 32. Therefore it is necessary to have only one means of connection between the steering apparatus and either one of said lamps.

As illustrated in Fig. 1 the device is shown in unlocked position. When it is desired to employ the locking means the lever 37 is drawn upward which operates the connecting rods 39 and 40 between the cam 38 and said lever 37, the operation of which is obvious. When the cam 38 turns it forces upward a lever 41 which is provided with a hole 42 through which passes said spindle 14. Said lever 41 in turn forces up the ring 28 engaging the notches thereof with the lugs 30 of said arm 31. When it is desired to unlock the lamps the lever 37 is forced downward into the position which is illustrated in Fig. 1 of the drawings.

Each spindle is provided with horns 43 to which is secured by means of clamps 44, its respective search light.

Although we have specifically described the construction of our invention yet we may exercise the right to make such changes therein as do not depart from the spirit of the invention or the scope of the claims hereunto appended.

Having described our invention what is claimed as new, is:

1. In a device of the kind specified comprising a plurality of spindles linked together in such manner that the rotation of one depends upon the rotation of the other to the same degree, means whereby each of the spindles are held for rotation, direct means of connection between one of the spindles and steering apparatus of the vehicle to which this device is applied, locking means interposed between the last mentioned means and said spindle, said locking means comprising a cam and manually operative means for the manipulation thereof.

2. In a device of the kind specified comprising a plurality of spindles linked together in such a manner that the rotation of one causes the rotation of the other to the same degree, means whereby each of the spindles are held for rotation, said means consisting of sockets which are held to the frame of the vehicle to which this device is applied, said sockets each consisting of a housing, a plurality of rings and a plurality of roller bearings, said spindle provided with rings which correspond to the rings of said housing, said roller bearings arranged in two sets, one of which sets is interposed between one of the rings of the housing and one of the rings of the spindle while the other set is arranged between the other ring of the housing and its corresponding ring of the spindle, direct means of connection between one of the spindles and the steering apparatus of the vehicle to which this device is applied, locking means interposed between the last mentioned means and said spindle.

3. In a device of the kind described comprising a plurality of spindles linked together in such a manner that the rotation of one causes the rotation of the other to the same degree, means whereby each of the spindles are held for rotation, said means consisting of sockets which are held to the frame of the vehicle to which this device is applied, each of said sockets consisting of a housing, a plurality of rings and a plurality of roller bearings, said spindle provided with rings which correspond to the rings of said housing, said roller bearings arranged in two sets, one of which sets is interposed between one of the rings of the housing and one of the rings of the spindle while the other set is arranged between similar rings arranged in a similar manner, direct means of connection between one of the spindles and the steering apparatus of the vehicle to which this device is attached.

4. In a device of the class described, a plurality of lamp supporting members adapted to be held in fixed positions on a vehicle, a plurality of lamp-carrying members each mounted for rotation relative to one of said lamp-supporting members, a rotative member fixed to one of the lamp-carrying members and operatively connected to the other lamp-carrying member for insuring the simultaneous rotation of the two lamp-carrying members, an operating member mounted on one of said lamp carrying members for slidable movement relative thereto and to the rotative member, said operating member being movable into, and out of, locking engagement with the rotative member, means for connecting the operating member directly to a part of a steering gear, and means for adjusting the operating member relative to the rotative member.

5. In a device of the class described, a plurality of lamp-supporting members each adapted to be secured to a vehicle, a plurality of lamp-carrying spindles each mounted for rotative movement in one of said lamp supporting members, a rotative member fixed to one of said lamp supporting spindles, means for connecting the rotative member to the other lamp supporting spindle for insuring simultaneous rotative movement of the two lamp-supporting spindles, an operating member mounted for movement on one of said lamp supporting spindles, said operating member having detachable interlocking engagement with said rotative member, means for connecting said operative member to a vehicle steering gear, and means independent of the steering-gear connections for adjusting the operating member into and out of engagement with the rotative member, whereby the operating member when engaged with the rotative member will transmit motion from the steering gear to one of the lamp-carrying spindles.

6. In a device of the class described, a lamp-supporting member, a lamp carrying member mounted in the lamp supporting member for rotative movement with relation thereto, a rotative member fixed to the lamp supporting member, an operating member slidable upon the lamp carrying member, said operating member being movable into and out of locking engagement with the rotative member, means for connecting the operating member directly to a steering gear, and means independent of the steering gear for adjusting the operating member into and out of locking engagement with the rotative member.

7. In a device of the class described, a lamp-supporting member provided with a casing, anti-friction bearings positioned within said casing, a lamp-carrying spindle supported by the anti-friction bearings for rotative movement within said casing, a rotative member fixed to said lamp carrying spindle, an operating member slidable on said lamp-carrying spindle, said operating member being movable into and out of interlocking engagement with the rotative member, means for connecting the operating member directly with a steering gear, and separate means for adjusting the operating member relative to the rotative member and thereby release the lamp carrying spindle from operative connection with the steering gear.

8. In a device of the class described, a lamp-supporting bracket, a lamp carrying spindle mounted in the bracket for rotative movement therein, a rotative collar fixed on said spindle, an operating member slidably fitted on the spindle, said operating member and the rotative collar having means for securing an interlocking engagement with each other, means for connecting the operating member to a steering gear, a second member slidable on the spindle and coöperating with the operating member, a cam for adjusting said second member, and means for operating said cam.

In testimony whereof we affix our signatures, in presence of two witnesses.

OTIS B. WOODFIELD.
OTTO M. MORRIS.
JOHN W. GOSLING.

Witnesses:
CLARK CLAYTON,
CHESTER WOODFIELD.